United States Patent [19]
Bauer

[11] 3,905,909
[45] Sept. 16, 1975

[54] PHYTOTOXIC DRAIN CLEANER
[75] Inventor: Henry Bauer, Miraleste, Calif.
[73] Assignee: Days-Ease Home Products Corporation, North Hollywood, Calif.
[22] Filed: June 4, 1973
[21] Appl. No.: 366,312

Related U.S. Application Data
[63] Continuation-in-part of Ser. No. 49,180, June 23, 1970.

[52] U.S. Cl. .............. 252/156; 252/157; 252/158; 252/152; 252/86; 252/174; 252/184; 252/DIG. 11; 134/2; 134/40; 134/42; 424/141; 424/143
[51] Int. Cl.$^2$.................. C11D 7/06; C11D 3/60
[58] Field of Search .......... 252/156, 157, 158, 152, 252/86, 174, 184, DIG. 11; 134/2, 40, 42; 7/4; 424/141, 143

[56] References Cited
UNITED STATES PATENTS

| | | | |
|---|---|---|---|
| 2,544,649 | 3/1951 | Bersworth | 23/184 |
| 2,551,446 | 5/1951 | Marks | 71/67 |
| 2,734,028 | 2/1956 | Domogalla | 210/23 |
| 2,997,444 | 8/1961 | Martin | 252/156 |
| 3,318,870 | 5/1967 | Teumac | 260/239 |
| 3,451,801 | 6/1969 | Teumac | 71/66 |
| 3,471,407 | 10/1969 | Spring | 252/157 |
| R23,766 | 1/1954 | Bersworth | 260/518 |

FOREIGN PATENTS OR APPLICATIONS

| | | |
|---|---|---|
| 571,529 | 3/1959 | Canada |

OTHER PUBLICATIONS
Martell et al., "Chemistry of the Metal Chelates, Compounds", Copyright 1952, Prentice Hall Inc., pp. 537–540.
Jonassen, et al., Journal of the American Chemical Society, Vol. 77, 1955, pp. 2748 and 2749.
Martell et al., "Chemistry of the Metal Chelates, Compounds", 1956, Prentice Hall, pp. 26, 27.
Chem. Abstracts –1187$^6$.

*Primary Examiner*—Benjamin R. Padgett
*Assistant Examiner*—B. Hunt
*Attorney, Agent, or Firm*—William H. Pavitt, Jr.

[57] ABSTRACT

A drain cleaning and scale and soap removing composition containing a water soluble copper chelate salt and an alkali metal hydroxide. The copper chelate salt is present in an amount sufficient to supply a phytotoxically effective quantity of copper ions when the composition is diluted with water in the treatment of a drain system. A further ingredient is an organic chelating agent which is effective in solubilizing copper and heavy metals in aqueous media in the presence of an alkali. The chelating agent is present in an amount in excess of that required to solubilize a phytotoxically effective quantity of copper ions with the excess quantity of chelating agent functioning to solubilize heavy metals in the drain system. The application of the composition to a drain system, thus, not only inhibits root growth, but also inhibits the formation of scale and insoluble heavy metal soaps.

13 Claims, No Drawings

PHYTOTOXIC DRAIN CLEANER

This application is a continuation-in-part of my prior copending U.S. application, Ser. No. 49,180, filed June 23, 1970.

Alkali metal hydroxides, such as sodium hydroxide, are a common component of liquid and particulate solid drain cleaner compositions which are used to remove organic material from a drain system. Frequently, a drain system may be seriously affected by the invasion of moisture-seeking root systems of plants, such as trees, adjacent to the system. Thus, it would be desirable to inhibit or kill root growth within the drain system being treated with this operation being carried out simultaneously with alkali treatment of the system. With use of the drain cleaner composition at a reasonably regular interval, the drain system would then not only be kept clean but root growth would also be eliminated or prevented.

A further problem which affects drain systems is the formation of heavy metal-containing deposits within the system which are commonly known as scale. Examples of heavy metals which are commonly found in tap water are calcium, magnesium, iron and manganese. In forming scale, these metals may form inorganic salts such as sulfates, carbonates, etc., and oxides. In addition, these metals may combine with fatty acid type materials, such as, for example, palmitic, stearic, oleic, or enoleic acid to form insoluble heavy metal soaps. With a build-up of scale and soap deposits within the drain system, the capacity of the system is reduced and, in severe cases, the system may have to be replaced.

In the application of a drain cleaner, it would, thus, also be desirable if the cleaner would be capable of inhibiting or preventing the formation of scale and metallic soap deposits within the system. Then, with use of the drain cleaner on a reasonably regular basis, the system could be kept free from scale and soaps such that its liquid-carrying capacity would not diminish appreciably with age.

Alkali drain cleaners, as such, are capable of digesting most organic matter encountered in a drain system. However, an alkali drain cleaner is not sufficiently effective in inhibiting the growth of roots within a drain system. Thus, it is well known to utilize a water soluble inorganic copper salt, such as copper sulfate, as a herbicide to kill plant roots within the drain system. The copper salt functions through systemic up-take of phytotoxic copper ions by the plant in an amount which is far in excess of the trace amounts of copper that are normally required for balanced plant growth.

In the use of water soluble copper salts as herbicides in a drain system, these materials have not been capable of use in the presence of an alkali because copper is precipitated through reaction with hydroxides. Thus, the addition of an otherwise effective phytotoxin, such as copper sulfate, to an alkali-containing drain cleaner causes precipitation of a water insoluble copper hydroxide on admixture of the drain cleaner with water. When this occurs, the phytotoxic copper ions are chemically bound in the insoluble hydroxide and are not available to inhibit or kill root growth within the drain system.

In accord with the present invention, I have discovered a drain cleaner composition which contains an alkali in an amount sufficient to digest organic materials within a drain system and also contains copper ions in a form which is stable in the presence of alkali and which is phytotoxically effective in killing or inhibiting root growth within the system. In providing the copper ions in a phytotoxically effective form, the copper is present in the form of a water soluble organic chelate in which the organic chelating agent is effective in solubilizing both copper and heavy metals in the presence of an alkali. The chelating agent is present in an amount in excess of the amount required to solubilize a phytotoxically effective quantity of copper ions with the excess of the chelating agent, thus, functioning to solubilize heavy metals within the drain system. Thus, treatment of a drain system with my composition not only digest organic materials within the system, but also inhibits root growth through the presence of the solubilized copper ions while inhibiting the formation of scale and heavy metal soaps within the drain system through the presence of the excess quantity of the chelating agent.

The copper chelates which are present in my drain cleaner composition may have a characteristic blue coloration. Thus, their presence provides a safety function in indicating the location of the drain cleaner if it is accidentally spilled. By observing the location of the blue coloration, the dangerous alkali metal hydroxide may be flushed away by directing water onto the colored area.

Preferably, the alkali in the drain cleaner composition is sodium hydroxide. Sodium hydroxide is relatively cheap and plentiful and any commercially available grade may be used. For example, the material may be used in the form of flakes, granules, or as an aqueous solution. An optional ingredient which is preferably present is an alkali-resistant surfactant in an amount of about 0.5 to about 5% by weight of the dry drain cleaner composition to increase the penetration properties of the drain cleaner. Exemplary of such surfactants are, for example, the phosphate surfactants having the formula

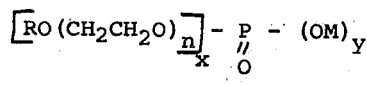

wherein $n$ is a number from about 7 to 50, $x$ is a number from 1 to 3, $y$ is 1, 2, or 0 and the sum of $x$ and $y$ equals 3. R may be a $C_8$–$C_{20}$ alkylphenyl group or a $C_8$–$C_{20}$ alkyl group and M may be hydrogen, sodium or ammonium.

Other forms of alkali may also be employed such as potassium hydroxide or lithium hydroxide. However, these materials are more expensive and, therefore, less desirable than sodium hydroxide. In addition, conventional additive materials which have previously been utilized in alkali drain cleaners may be present. These additive materials include, for example, particulate aluminum, fillers and reducing agents to preclude the evolution of hydrogen gas which is highly flammable.

The water-soluble copper chelate salt is one in which copper is combined with an organic chelating agent that is effective in solubilizing copper and heavy metals in the presence of an alkali. Thus, for example, the copper salt may be a salt of copper with an aminopolycarboxylic acid such as ethylenediaminetetraacetic acid. A copper salt which has been found particularly suitable is disodium copper ethylenediaminetetraacetate. This material may be obtained, for example, by the reaction of copper sulfate pentahydrate and tetrasodium ethylenediaminetetraacetate as shown by the following equation:

$Na_4EDTA + CuSO_4.5H_2O \rightarrow Na_2CuEDTA + Na_2SO_4.5H_2O$

The disodium copper salt of EDTA is a commercially available material and is exemplary of other copper-organic chelates which may be utilized with the organic chelate incorporated, in part, in the structure of the water-soluble copper salt. Other organic chelates include, for example, $Na_4EDTA$ tetrasodium ethylenediaminetetraacetate
$Na_5DPTA$ pentasodium diethylenetriaminepentaacetate
$Na_3HEDTA$ trisodium n-hydroxyethylenediaminetriacetate
Na DHE sodium n-dihydroxyethylaminoacetate
$Na_3NTA$ trisodium nitrilotriacetate The organic chelate employed, such as sodium citrate, citric acid, sodium tartrate, or an aminopolycarboxylic acid are incorporated, in part, in the structure of the water-soluble copper salt. By analogy to the reaction of copper sulfate pentahydrate with tetrasodium ethylenediaminetetraacetate shown above, corresponding chelates may be formed through reaction of a copper compound, such as copper sulfate pentahydrate with the organic chelate.

In the formation of a copper chelate as the water-soluble copper salt, it should be understood that the organic chelate reactant is employed in a stoichiometric excess above that required for reaction with copper to convert the copper to a form which is phytotoxically effective in an aqueous media in the presence of an alkali. Generally, the organic chelate is present in an excess of about 100% or more than the amount of chelate required to solubilize a phytotoxically effective amount of copper.

As stated, the organic chelate is pre-reacted with copper rather than being reacted in situ after addition of the drain cleaner composition to a drain system. This procedure is used because it insures that the copper will be in a phytotoxically effective form immediately upon addition to a drain system. The reaction of copper with an alkali hydroxide to form an insoluble hydroxide is more rapid than the reaction of copper with an organic chelate and, thus, the reaction to form a copper chelate is not effectively carried out in an alkali medium. However, the loss of copper from the drain system in a form where it is not phytotoxically effective is reduced to a minimum when the copper is pre-reacted with the organic chelate.

Various amounts of a water-soluble copper salt may be employed in the drain cleaner composition depending upon the phytotoxic effects which are desired in use of the drain cleaner. During usage of the cleaner, it may be diluted with water for passage through the drain system. Thus, the drain cleaner composition may be added dry to the drain system and then be followed by water which not only activates the ingredients in the drain cleaner, but also moves these ingredients through the drain system. Typically, for example, the drain cleaner composition on a dry basis may be diluted with from about 10 to about 75% or more by weight of water and, on the average, about 50% of water.

In general, it has been found that a copper concentration in the order of at least about 100 parts per million, based on the weight of the drain cleaner composition and the weight of added water, is suitable for the inhibition and/or killing of root growth within a system. Using copper at a phytotoxically effective concentration ranging up to about 5% by weight of the dry drain cleaner composition, a level of 100 parts copper per million is easily attainable over a wide range of dilutions of the drain cleaner composition with water.

In formulating a drain cleaner composition according to the invention, the copper level may be varied over a relatively wide range, e.g., up to about 5% by weight of the dry drain cleaner composition as copper or about 10% by weight as copper sulfate and the organic chelating agent may also be varied accordingly, e.g., up to about 20% by weight. The alkali can also be varied and is generally present, for example, in an amount sufficient to provide a pH of about 13 to 13.5 on addition of the drain cleaner to a drain system. In prereaction of a copper salt, such as copper sulfate, with an organic chelate, there is formed a copper chelate and also sodium sulfate. These materials do not need to be separated for use of the copper chelate in my drain cleaner composition. Thus, the quantity of copper in the composition, on a dry basis, may be expressed, for example, as percent by weight of copper sulfate — even though the copper is no longer in the sulfate form in the composition. If desired, the drain cleaner may also contain water, e.g., about 10 to about 75% by weight and the drain cleaner may then be added directly to the drain system without diluting with additional water.

I claim:

1. A drain cleaning and scale and soap removing composition comprising:
    an alkali metal hydroxide in an amount sufficient to provide a pH of about 13 to 13.5 when said composition is added to a drain system;
    a water soluble copper salt of an organic chelating agent in an amount sufficient to supply a phytotoxically effective quantity of copper ions in the treatment of a drain system;
    said organic chelating agent being effective to solubilize copper and heavy metals in the presence of an alkali at a pH of about 13 to 13.5, and
    said chelating agent being present in an amount in excess of the amount required to solubilize a phytotoxically effective quantity of copper ions sufficient to inhibit root growth within a treated drain system with the excess chelating agent functioning to solubilize heavy metals within the drain system,
    whereby root growth within a treated drain system is inhibited by the solubilized copper ions while the formation of scale and heavy metal soaps within a treated drain system is inhibited by the excess of the chelating agent through solubilization of the heavy metals in the system.

2. The composition of claim 1 wherein said alkali metal hydroxide is sodium hydroxide.

3. The composition of claim 1 wherein said copper salt is present in an amount sufficient to provide a copper ion concentration of about 100 parts per million or greater in the treatment of a drain system.

4. The composition of claim 1 wherein said organic chelating agent is present in an amount of about 100% excess or greater than the amount of organic chelating agent required to solubilize the copper in said composition.

5. The composition of claim 1 wherein said organic chelating agent is an aminopolycarboxylic acid.

6. The composition of claim 5 wherein said chelating agent is ethylenediaminetetraacetic acid or a material which forms ethylenediaminetetraacetic acid in an aqueous medium.

7. The composition of claim 5 wherein said organic chelating agent is diethylenetriaminepentaacetic acid or a material which forms diethylenetriaminepentaacetic acid in an aqueous medium.

8. The composition of claim 5 wherein said organic chelating agent is n-hydroxyethylenediaminetriacetic acid or a material which forms n-hydroxyethylenediaminetriacetic acid in an aqueous medium.

9. The composition of claim 5 wherein said organic chelating agent is n-dihydroxyethylaminoacetic acid or a material which forms n-dihydroxyethylaminoacetic acid in an aqueous medium.

10. The composition of claim 5 wherein said organic chelating agent is nitrilotriacetic acid or a material which forms nitrilotriacetic acid in an aqueous medium.

11. The composition of claim 1 wherein said copper salt is disodium copper ethylenediaminetetraacetate.

12. The composition of claim 1 including from about 0.5 to about 5% by weight of an alkali resistant surfactant.

13. The composition of claim 12 wherein said surfactant has the formula

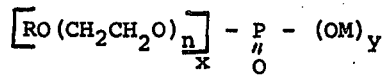

in which R is a $C_8$–$C_{20}$ alkylphenyl group or a $C_8$–$C_{20}$ alkyl group, M is hydrogen, sodium or ammonium, $n$ is a number from about 7 to 50, $x$ is a number from 1 to 3, $y$ is 1, 2, or 0, and the sum of $x$ and $y$ equals 3.

* * * * *